US012736034B2

(12) United States Patent
Kato

(10) Patent No.: US 12,736,034 B2
(45) Date of Patent: Sep. 15, 2026

(54) FUEL PUMP

(71) Applicant: MITSUBISHI HEAVY INDUSTRIES ENGINE & TURBOCHARGER, LTD., Sagamihara (JP)

(72) Inventor: Kensho Kato, Tokyo (JP)

(73) Assignee: MITSUBISHI HEAVY INDUSTRIES ENGINE & TURBOCHARGER, LTD., Sagamihara (JP)

(*) Notice: Subject to any disclaimer, the term of this patent is extended or adjusted under 35 U.S.C. 154(b) by 80 days.

(21) Appl. No.: 18/290,338

(22) PCT Filed: May 30, 2022

(86) PCT No.: PCT/JP2022/021941
§ 371 (c)(1),
(2) Date: Nov. 13, 2023

(87) PCT Pub. No.: WO2023/281937
PCT Pub. Date: Jan. 12, 2023

(65) Prior Publication Data

US 2024/0247628 A1 Jul. 25, 2024

(30) Foreign Application Priority Data

Jul. 6, 2021 (JP) ................................ 2021-112246

(51) Int. Cl.
*F02M 59/02* (2006.01)
*F02M 59/08* (2006.01)
(Continued)

(52) U.S. Cl.
CPC ........... *F04B 1/0421* (2013.01); *F02M 59/02* (2013.01); *F02M 59/08* (2013.01); *F04B 53/16* (2013.01); *F02M 59/025* (2013.01)

(58) Field of Classification Search
CPC ....... F04B 1/0421; F04B 53/16; F02M 59/02; F02M 59/08; F02M 59/025; F02M 59/102; F02M 59/462; F02M 59/48; F02M 59/44
See application file for complete search history.

(56) References Cited

U.S. PATENT DOCUMENTS 4,776,260 A * 10/1988 Vincze .................. F04B 53/143 92/162 R
5,921,760 A 7/1999 Isozumi et al.
(Continued)

FOREIGN PATENT DOCUMENTS

JP 10-184483 A 7/1998
JP 10-318091 A 12/1998
(Continued)

OTHER PUBLICATIONS

Written Opinion of the International Searching Authority for International Application No. PCT/JP2022/021941, dated Aug. 16, 2022, with English translation.
(Continued)

*Primary Examiner* — Dominick L Plakkoottam
(74) *Attorney, Agent, or Firm* — Birch, Stewart, Kolasch & Birch, LLP

(57) ABSTRACT

A fuel pump comprising: a pump head (23); a plunger barrel (32) provided with a support hole (38) and having one end portion side of the support hole (38) in the axial direction fastened to the pump head (23); a plunger (41) supported by the support hole (38) so as to move along the axial direction; a pressurizing chamber (56) defined by one end portion of the support hole (38) and one end portion of the plunger (41) in the axial direction; a fuel discharge passage (73) having one end portion communicating with the pressurizing chamber (56); a fuel suction passage (70) having one end portion communicating with the fuel discharge passage; and a
(Continued)

recessed portion (101) provided to at least one of the inner surface of the one end portion of the support hole (38) and the outer surface of one end portion of the plunger (41).

5 Claims, 5 Drawing Sheets

(51) Int. Cl.
*F04B 1/0421* (2020.01)
*F04B 53/16* (2006.01)

(56) References Cited

U.S. PATENT DOCUMENTS

| | | | | |
|---|---|---|---|---|
| 2004/0052652 | A1 | 3/2004 | Yamada et al. | |
| 2004/0179963 | A1* | 9/2004 | Kubota | F02M 59/44<br>417/470 |
| 2009/0032753 | A1* | 2/2009 | Ishibashi | H01F 7/081<br>251/129.15 |
| 2011/0259301 | A1* | 10/2011 | Kato | F02M 55/025<br>123/447 |
| 2017/0058849 | A1* | 3/2017 | Marsden | F02M 61/167 |
| 2020/0325868 | A1 | 10/2020 | Mercer et al. | |

FOREIGN PATENT DOCUMENTS

| | | | |
|---|---|---|---|
| JP | 2010-180783 | A | 8/2010 |
| JP | 2010-229898 | A | 10/2010 |
| KR | 10-2016-0049175 | A | 5/2016 |
| KR | 101881872 | B1 * | 7/2018 |
| WO | WO 02/055881 | A1 | 7/2002 |

OTHER PUBLICATIONS

Korean Office Action for Korean Application No. 10-2023-7037835, dated Apr. 28, 2025, with English translation.

* cited by examiner

FUEL PUMP

TECHNICAL FIELD

The present disclosure relates to a fuel pump applied to an internal combustion engine.

BACKGROUND ART

For example, a common-rail-type fuel injection device applied to a diesel engine includes a fuel pump, a common rail, and a fuel injector. The fuel pump inhales fuel from a fuel tank, pressurizes the fuel, and supplies the fuel to the common rail as high-pressure fuel. The common rail holds the high-pressure fuel supplied from the fuel pump at a predetermined pressure. The fuel injector injects the high-pressure fuel of the common rail into a combustion chamber of the diesel engine by opening and closing the injector. The fuel pump includes plunger barrels, plungers, suction valves, and discharge valves. In a case where the plunger moves inside the plunger barrel in one direction, the suction valve is opened and the fuel is inhaled into the pressurization chamber. In a case where the plunger moves inside the plunger barrel in the other direction, the fuel in the pressurization chamber is pressurized, and the discharge valve is opened to discharge the high-pressure fuel. Examples of such a fuel pump include a fuel pump described in PTL 1 below.

CITATION LIST

Patent Literature

[PTL 1] Japanese Unexamined Patent Application Publication No. 2010-229898

SUMMARY OF INVENTION

Technical Problem

The fuel pump inhales low-pressure fuel into the pressurization chamber by reciprocating of the plunger, and discharges pressurized high-pressure fuel. The plunger is movably supported by a support hole provided in the plunger barrel, and the pressurization chamber is provided at an end portion of the support hole. Since the pressurization chamber holds the high-pressure fuel, a highly accurate clearance is required between the plunger and the support hole. In addition, since the plunger moves in the support hole at high speed and under high-pressure conditions, high reliability against burn-in is also required.

In the related art, the plunger barrel is bolt-fastened to a pump body. In this case, the plunger barrel is fastened to the pump body by screwing a plurality of bolts penetrating the pump body around the support hole in the plunger barrel. The pump body and the plunger barrel are fastened with a high bolt axial force because it is necessary to ensure high sealing performance between the pump body and the plunger barrel. At this time, the plunger barrel is elastically deformed due to the fastening force of the bolt, and roundness of the support hole is reduced. In addition, it becomes difficult to ensure a highly accurate clearance between the plunger and the support hole, and there is a problem that reliability against burn-in is lowered. As a countermeasure, it is considered to perform grinding processing on the support hole after fastening using a jig similar to the actual elastic deformation. However, in this processing, a dedicated jig is required, and as a result, this causes an increase in manufacturing cost and working time.

The present disclosure has been made to solve the above-described problems, and an object of the present disclosure is to provide a fuel pump that ensures good operability between a plunger and a plunger barrel and suppresses an increase in processing cost.

Solution to Problem

In order to achieve the above object, according to the present disclosure, there is provided a fuel pump including: a pump head; a plunger barrel that is provided with a support hole and in which one end portion side of the support hole in an axial direction is fastened to the pump head; a plunger that is supported by the support hole so as to be movable along the axial direction; a pressurization chamber partitioned by one end portion of the support hole and one end portion of the plunger in the axial direction; a fuel discharge channel of which one end portion communicates with the pressurization chamber; a fuel suction channel of which one end portion communicates with the fuel discharge channel; and a recess portion that is provided on at least one of an inner surface of the one end portion of the support hole or an outer surface of the one end portion of the plunger.

Advantageous Effects of Invention

According to the fuel pump of the present disclosure, good operability between the plunger and the plunger barrel can be ensured, and an increase in processing cost can be suppressed.

DESCRIPTION OF EMBODIMENTS

Hereinafter, a preferred embodiment of the present disclosure will be described in detail with reference to the drawings. The present disclosure is not limited by the embodiment, and in a case where there are a plurality of embodiments, the present disclosure also includes a configuration in which the respective embodiments are combined with each other. In addition, components in the embodiment include components that can be easily assumed by those skilled in the art, components that are substantially the same, or components that fall within an equivalent range.

<Fuel Injection Device>

Figure 1:
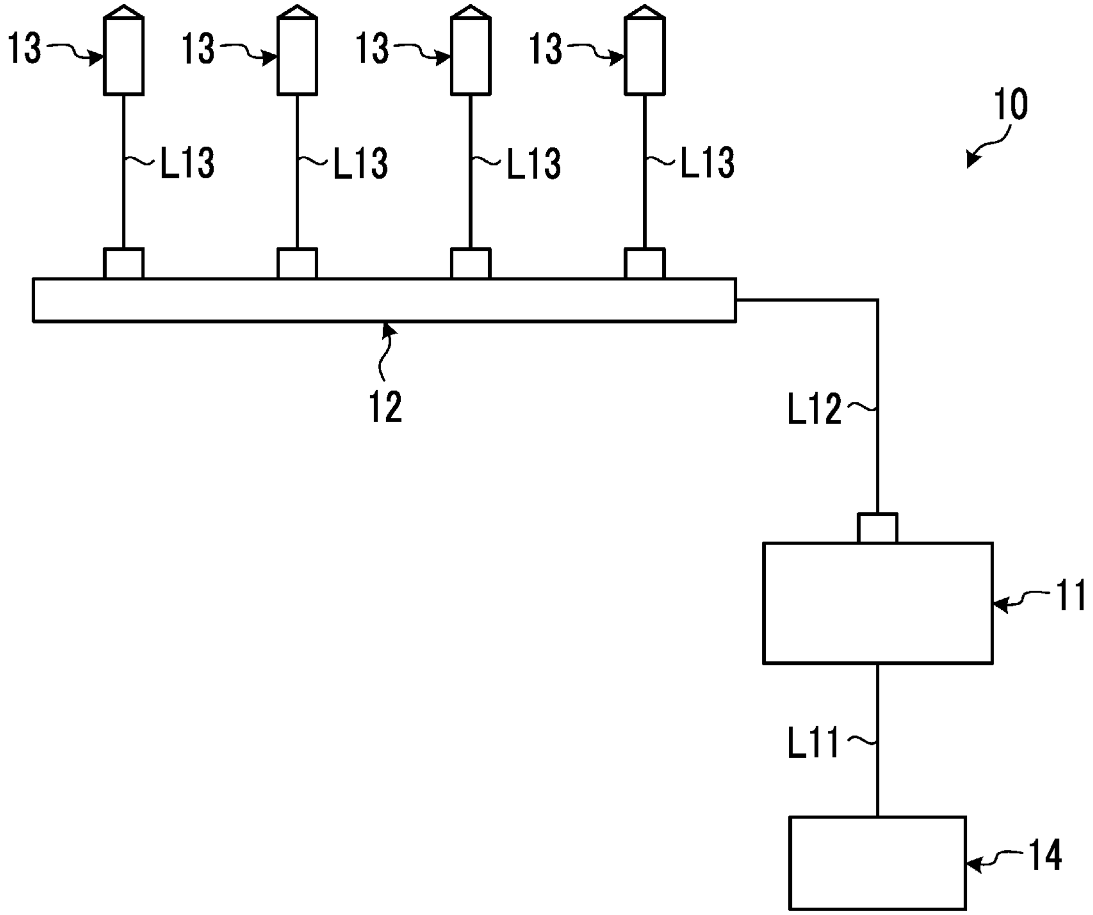
FIG. 1 is a schematic configuration diagram illustrating a fuel injection device of the present embodiment.

FIG. 1 is a schematic configuration diagram illustrating a fuel injection device of the present embodiment.

As illustrated in FIG. 1, the fuel injection device 10 is mounted on a diesel engine (internal combustion engine). The fuel injection device 10 includes a fuel pump 11, a common rail 12, and a plurality of fuel injectors 13.

A fuel tank 14 is connected to the fuel pump 11 via a fuel line L11. The fuel pump 11 inhales the fuel stored in the fuel tank 14 from the fuel line L11, and pressurizes the fuel to generate high-pressure fuel. The common rail 12 is connected to the fuel pump 11 via a high-pressure fuel line L12. The common rail 12 adjusts the high-pressure fuel supplied from the fuel pump 11 to a predetermined pressure. The fuel injectors 13 are respectively connected to the common rail 12 via a plurality of (in the present embodiment, four) fuel supply lines L13. The fuel injector 13 injects the high-pressure fuel of the common rail 12 into each cylinder (combustion chamber) of the diesel engine by opening and closing the injector.

<Fuel Pump>

Figure 2:
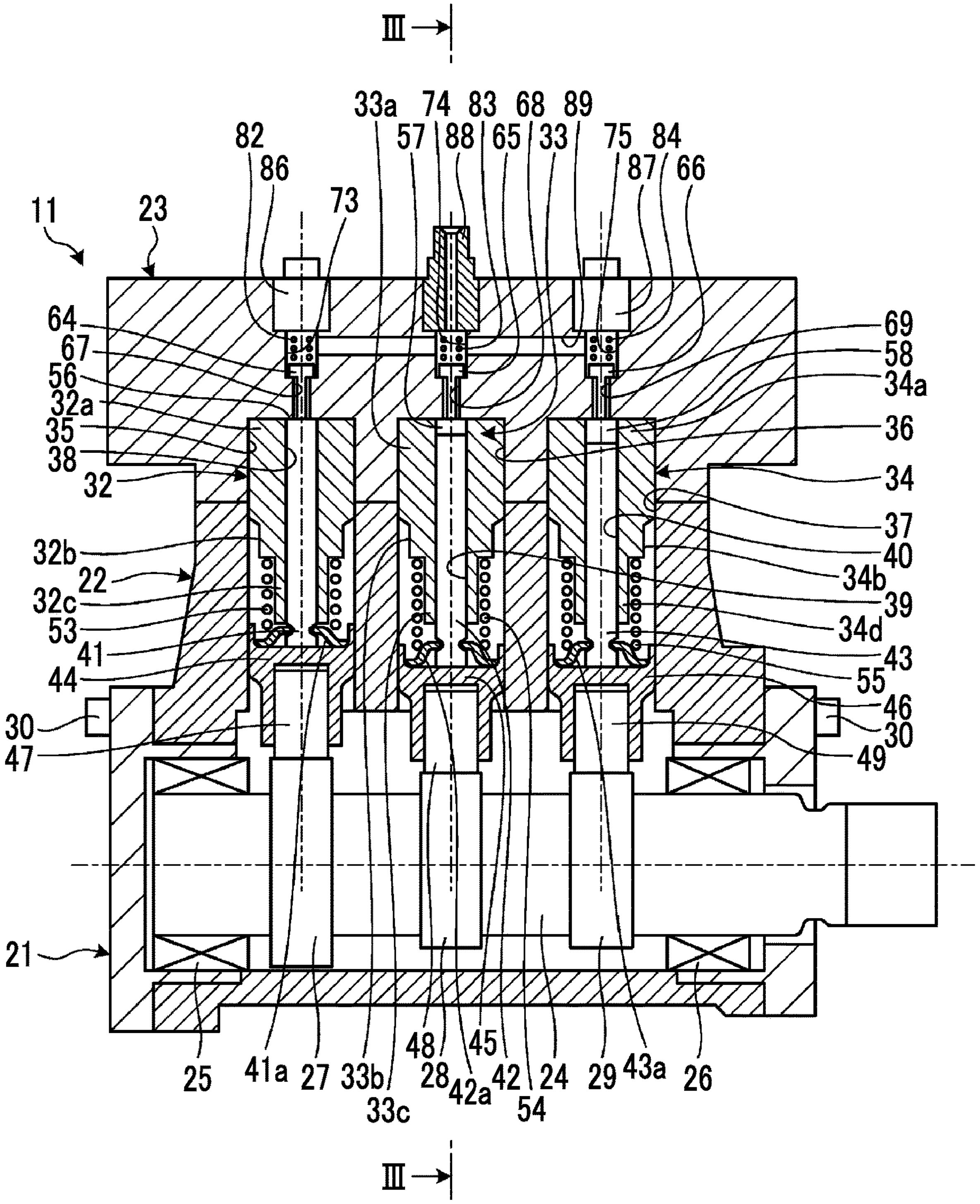
FIG. 2 is a vertical sectional view illustrating a fuel pump of the present embodiment.
Figure 3:
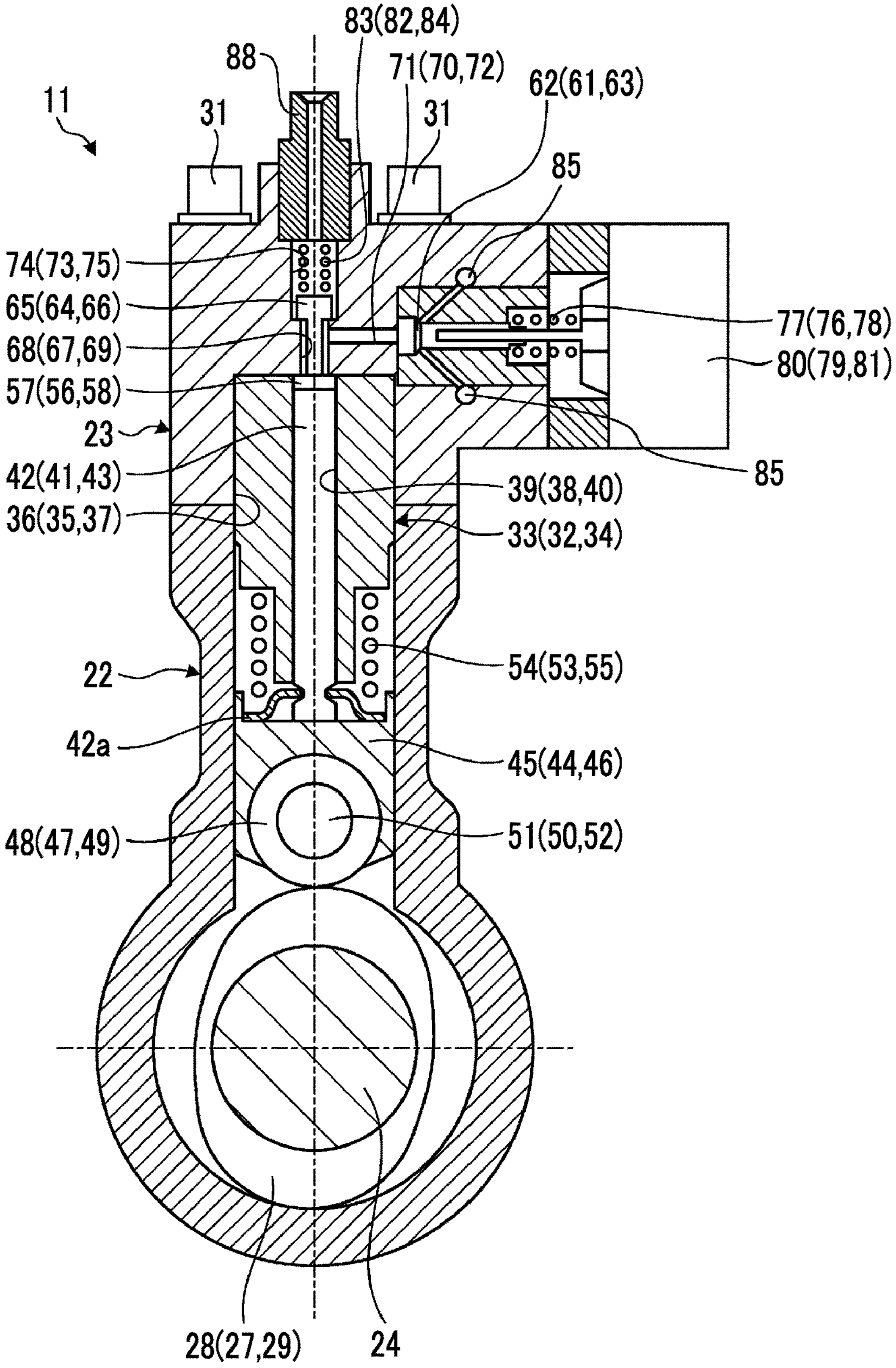
FIG. 3 is a sectional view taken along a III-III line of FIG. 2 illustrating a vertical section of the fuel pump.

FIG. 2 is a vertical sectional view illustrating the fuel pump of the present embodiment, and FIG. 3 is a sectional view taken along a III-III line of FIG. 2 illustrating a vertical section of the fuel pump. The fuel pump to be described below has a type in which three plungers are disposed. On the other hand, the number of the plungers is not limited thereto.

As illustrated in FIG. 2 and FIG. 3, a housing of the fuel pump 11 is configured by bolt-fastening a retainer 21, a pump casing 22, and a pump head 23. A cam shaft 24 is disposed inside the pump casing 22. Each end portion of the cam shaft 24 in an axial direction is rotatably supported by the retainer 21 by bearings 25 and 26. One end portion of the cam shaft 24 in the axial direction protrudes to the outside of the retainer 21, and a driving force is input from the diesel engine. In the cam shaft 24, a plurality of (in the present embodiment, three) cams 27, 28, and 29 are provided at intervals in the axial direction. The cams 27, 28, and 29 have different phases in a circumferential direction.

The retainer 21 is fastened to the pump casing 22 by a plurality of bolts 30. The plurality of bolts 30 penetrate the retainer 21, and tip portions of the plurality of bolts 30 are screwed to the pump casing 22. The pump head 23 is fastened to the pump casing 22 by a plurality of bolts 31. The plurality of bolts 31 penetrate the pump head 23, and are screwed into the pump casing 22.

Three plunger barrels 32, 33, and 34 are disposed inside the pump casing 22 and the pump head 23. Each of the plunger barrels 32, 33, and 34 has the same configuration. The pump casing 22 and the pump head 23 are provided with three accommodation holes 35, 36, and 37 along a direction orthogonal to the axial direction of the cam shaft 24. The accommodation holes 35, 36, and 37 are formed across the pump casing 22 and the pump head 23. Each of the plunger barrels 32, 33, and 34 is disposed in each of the accommodation holes 35, 36, and 37. That is, the plunger barrels 32, 33, and 34 respectively includes first shaft portions 32*a*, 33*a*, and 34*a*, second shaft portions 32*b*, 33*b*, and 34*b*, and third shaft portions 32*c*, 33*c*, and 34*c* along the axial direction. Outer diameters of the plunger barrels 32, 33, and 34 decrease in order of the first shaft portions 32*a*, 33*a*, and 34*a*, the second shaft portions 32*b*, 33*b*, and 34*b*, and the third shaft portions 32*c*, 33*c*, and 34*c*. In the plunger barrels 32, 33, and 34, the first shaft portions 32*a*, 33*a*, and 34*a* are supported by the accommodation holes 35, 36, and 37.

Support holes 38, 39, and 40 are respectively formed inside the plunger barrels 32, 33, and 34 along the axial direction. The support holes 38, 39, and 40 respectively penetrate the plunger barrels 32, 33, and 34 in the axial direction. In the plunger barrels 32, 33, and 34, plungers 41, 42, and 43 are respectively disposed in the support holes 38, 39, and 40. Each of the plungers 41, 42, and 43 is movably supported along the axial direction in each of the support holes 38, 39, and 40 of the plunger barrels 32, 33, and 34.

Tappets 44, 45, and 46 and rollers 47, 48, and 49 are respectively disposed between the plungers 41, 42, and 43 and the cams 27, 28, and 29. The rollers 47, 48, and 49 are rotatably supported by the tappets 44, 45, and 46 by using supporting shafts 50, 51, and 52. In the plungers 41, 42, and 43, spring seats 41*a*, 42*a*, and 43*a* are disposed at lower end portions in the axial direction. Compression coil springs 53, 54, and 55 are disposed between the plunger barrels 32, 33, and 34 and the spring seats 41*a*, 42*a*, and 43*a*. The compression coil springs 53, 54, and 55 press the plungers 41, 42, and 43 against the tappets 44, 45, and 46 by an energizing force acting on the spring seats 41*a*, 42*a*, and 43*a*, and the rollers 47, 48, and 49 are pressed against the cams 27, 28, and 29 via the tappets 44, 45, and 46. Outer peripheral surfaces of the rollers 47, 48, and 49 come into contact with outer peripheral surfaces of the cams 27, 28, and 29.

In the plunger barrels 32, 33, and 34, pressurization chambers 56, 57, and 58 are formed in the support holes 38, 39, and 40 on one end portion side in the axial direction. The pressurization chambers 56, 57, and 58 are partitioned by inner peripheral surfaces of the support holes 38, 39, and 40, end surfaces of the plungers 41, 42, and 43 on one end portion side in the axial direction, end surfaces of discharge valves 64, 65, and 66 to be described later, and end surfaces of suction valves 61, 62, and 63 to be described later. The plungers 41, 42, and 43 move the support holes 38, 39, and 40 to the one end portion side in the axial direction, and thus the fuel inhaled into the pressurization chambers 56, 57, and 58 can be pressurized.

In the pump head 23, suction valves 61, 62, and 63 and discharge valves 64, 65, and 66 are disposed. In the pump head 23, fuel channels 67, 68, and 69 that respectively communicate with the support holes 38, 39, and 40 of the plunger barrels 32, 33, and 34 are provided. The fuel channels 67, 68, and 69 are disposed in a straight line with the support holes 38, 39, and 40. One end portions of the fuel channels 67, 68, and 69 communicate with the support holes 38, 39, and 40. One end portions of suction channels (fuel suction channels) 70, 71, and 72 communicate with middle portions of the fuel channels 67, 68, and 69. One end portions of discharge channels (fuel discharge channels) 73, 74, and 75 communicate with the other end portions of the fuel channels 67, 68, and 69. The suction channels 70, 71, and 72 are provided in a direction orthogonal to the fuel channels 67, 68, and 69. The fuel channels 67, 68, and 69 are also used as a part of the fuel suction channels and the fuel discharge channels.

In the suction channels 70, 71, and 72, the suction valves 61, 62, and 63 are disposed. The suction valves 61, 62, and 63 are energized by the compression coil springs 76, 77, and 78 in a direction to open the suction channels 70, 71, and 72, and are operated to close the suction channels 70, 71, and 72 by the actuators 79, 80, and 81. The discharge valves 64, 65, and 66 are disposed in the discharge channels 73, 74, and 75. The discharge valves 64, 65, and 66 are energized by compression coil springs 82, 83, and 84 in a direction to close the discharge channels 73, 74, and 75, and are operated to open the discharge channels 73, 74, and 75 by the fuel pressure. In this case, the pressurization chambers 56, 57, and 58 communicate with the fuel channels 67, 68, and 69 and the suction channels 70, 71, and 72.

The three suction channels 70, 71, and 72 communicate with each other by communication channels (fuel-suction-side communication channels) 85. The fuel line L11 from the fuel tank 14 (both refer to FIG. 1) is connected to the communication channel 85. Plugs 86 and 87 are mounted to the other end portions of the discharge channels 73 and 75, and close the discharge channels 73 and 75. A connector 88 is mounted to the other end portion of the discharge channel 74. In addition, the three discharge channels 73, 74, and 75 are communicated with each other by a communication channel (fuel-discharge-side communication channel) 89. The common rail 12 (both refer to FIG. 1) is connected to the connector 88 via the high-pressure fuel line L12. The communication channel 89 allows the discharge channels 73, 74, and 75 to communicates with each other. On the other hand, the communication channel 89 may be disposed in a linear shape to intersect with the discharge channels 73, 74, and 75, and may directly communicate with the discharge channels 73, 74, and 75. Alternatively, the communication channel 89 may be disposed with an offset in a direction perpendicular to the paper surface of FIG. 2, and may indirectly communicate with the discharge channels 73, 74, and 75.

Therefore, when the cam shaft 24 rotates, a rotational force is converted into a reciprocating force by the cams 27, 28, and 29, and the converted force is transmitted to the rollers 47, 48, and 49 and the tappets 44, 45, and 46. Due to the movement of the rollers 47, 48, and 49 and the tappets 44, 45, and 46, the plungers 41, 42, and 43 reciprocate along the axial direction in the support holes 38, 39, and 40 of the plunger barrels 32, 33, and 34. When the suction valves 61, 62, and 63 open the suction channels 70, 71, and 72 and the plungers 41, 42, and 43 move to the other side in the axial direction (a lower side in FIG. 2 and FIG. 3), the low-pressure fuel in the communication channel 85 is inhaled into the pressurization chambers 56, 57, and 58 via the suction channels 70, 71, and 72 and the fuel channels 67, 68, and 69. When the plungers 41, 42, and 43 reach a bottom dead point, in a step in which the plungers 41, 42, and 43 head toward a top dead point, in a case where the actuators 79, 80, and 81 are operated, the suction valves 61, 62, and 63 move against the energizing force of the compression coil springs 76, 77, and 78, and close the suction channels 70, 71, and 72.

In a state where the low-pressure fuel is inhaled into the pressurization chambers 56, 57, and 58, when the plungers 41, 42, and 43 move to one side in the axial direction (upper side in FIG. 2 and FIG. 3), before the actuators 79, 80, and 81 are operated, the low-pressure fuel is returned from the suction channels 70, 71, and 72 to the communication channel 85 via the suction valves 61, 62, and 63. After the actuators 79, 80, and 81 are operated, the low-pressure fuel is closed by the suction valves 61, 62, and 63, and volumes of the pressurization chambers 56, 57, and 58 are reduced. Thus, the low-pressure fuel in the pressurization chambers 56, 57, and 58 is pressurized. When the low-pressure fuel in the pressurization chambers 56, 57, and 58 is pressurized to a predetermined pressure, the discharge valves 64, 65, and 66 move against the energizing force of the compression coil springs 82, 83, and 84 and the pressure received from the common rail 12, and open the discharge channels 73, 74, and 75. Then, the high-pressure fuel in the pressurization chambers 56, 57, and 58 is discharged from the fuel channels 67, 68, and 69 to the discharge channels 73, 74, and 75. In addition, the high-pressure fuel in the discharge channels 73, 74, and 75 is joined at the communication channel 89, and is discharged from the connector 88 to the high-pressure fuel line L12 (refer to FIG. 1). Thereafter, when the plungers 41, 42, and 43 reach the top dead point, discharge of the high-pressure fuel is ended. When the plungers 41, 42, and 43 start to move to the other side in the axial direction, the volumes of the pressurization chambers 56, 57, and 58 are increased, and thus, the pressure in the pressurization chambers 56, 57, and 58 decreases. The discharge valves 64, 65, and 66 move due to the energizing force of the compression coil springs 82, 83, and 84 and the pressure received from the common rail 12, and close the discharge channels 73, 74, and 75.

<Plunger and Plunger Barrel>

Figure 4:
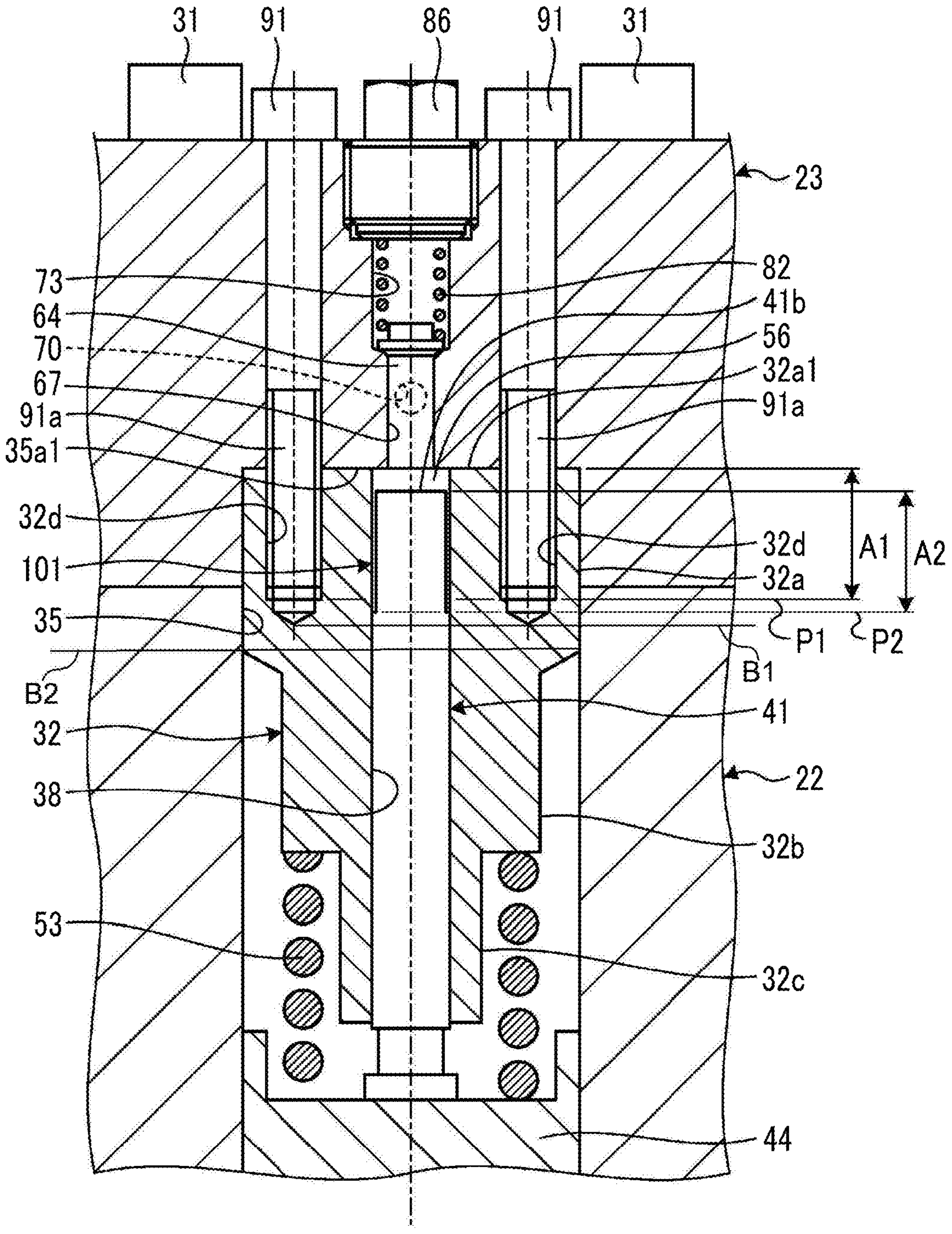
FIG. 4 is an enlarged view illustrating a configuration of a plunger and a plunger barrel.

FIG. 4 is an enlarged view illustrating a configuration of the plunger and the plunger barrel. Since each of the plungers 41, 42, and 43 and each of the plunger barrels 32, 33, and 34 have substantially the same configuration, only the plunger 41 and the plunger barrel 32 will be described.

As illustrated in FIG. 4, the pump head 23 is fastened to the pump casing 22 by bolts 31. The pump casing 22 and the pump head 23 are provided with the accommodation hole 35 inside, and the plunger barrel 32 is supported by the accommodation hole 35. That is, in the plunger barrel 32, the first shaft portion 32*a* is accommodated in the accommodation hole 35. One end portion side of the plunger barrel 32 in the axial direction is fastened to the pump head 23. The plurality of bolts 91 penetrate the pump head 23, and a male thread portion 91*a* of a tip portion of the bolt 91 is screwed around the support hole 38 in the plunger barrel 32, that is, to a female thread portion 32*d* of the first shaft portion 32*a*. Here, the female thread portion 32*d* is formed in a range of a length A1 from the end surface of the first shaft portion 32*a* toward the other end portion side of the plunger barrel 32 in the axial direction.

Support hole 38 is formed in the plunger barrel 32, and the plunger 41 is movably supported by the support hole 38. The pump head 23 is provided with a fuel channel 67, and communicates with the support hole 38. The fuel channel 67 communicates with the suction channel 70, and communicates with the discharge channel 73. A suction valve 61 (refer to FIG. 3) is disposed in the suction channel 70, and a discharge valve 64 is disposed in the fuel channel 67 and the discharge channel 73.

The pressurization chamber 56 is configured to be partitioned by an inner peripheral surface of the support hole 38, an end surface 41*b* of the plunger 41, and an end surface of the discharge valve 64. The plurality of bolts 91 penetrate the pump head 23, and the male thread portion 91*a* is screwed into the female thread portion 32*d* of the plunger barrel 32. Thereby, the plunger barrel 32 is fastened to the pump head 23. At this time, in the plunger barrel 32, the first shaft portion 32*a* is pulled up to the pump head 23 side by the bolt 91, and an end surface 32*al* of the first shaft portion 32*a* comes into close contact with an end surface 35*al* of a first hole 35*a* of the pump head 23. Thereby, a sealing portion is configured between the end surface 32*al* of the first shaft portion 32*a* and the end surface 35*al* of the first hole 35*a*, and thus sealing performance is ensured.

On the other hand, as described above, the plunger barrel 32 is fastened to the pump head 23 by the plurality of bolts 91. In addition, the plunger barrel 32 is elastically deformed by the fastening force of the bolt 91, and roundness of the support hole 38 is reduced. As a result, it becomes difficult to ensure a highly accurate clearance between the plunger 41 and the support hole 38. In particular, in the support hole 38, one end portion side of the plunger barrel 32 in the axial direction that is to be screwed to the male thread portion 91*a* of the bolt 91 is easily deformed.

Therefore, in the present embodiment, a recess portion 101 is provided on the outer peripheral surface of one end portion of the plunger 41 in the axial direction. That is, the plunger 41 has a columnar shape, and the outer peripheral surface of the plunger 41 is concentrically disposed with the inner peripheral surface of the support hole 38. In addition, in the plunger 41, an outer diameter of one end portion on the pressurization chamber 56 side is smaller than an outer diameter of the other portion, and thus the recess portion 101 is formed.

The recess portion 101 is provided within a range of a predetermined length A2 from the end surface 41*b* on the one end portion side of the plunger 41 to the other end portion side of the plunger 41. In addition, the recess portion 101 is provided from a screwing position at which the male thread portion 91*a* of the bolt 91 is screwed to the female thread portion 32*d* of the plunger barrel 32 to the other end portion side of the plunger 41 in the axial direction. That is, when the plunger 41 is at a top dead point position, preferably, a position P2 on the other side (a lower side in FIG. 4) of the plunger 41 in the recess portion 101 is located on the other side (a lower side in FIG. 4) from a position P1 on the other side (a lower side in FIG. 4) of the female thread portion 32*d* of the plunger barrel 32.

Further, the plunger 41 and the support hole 38 have a columnar shape, and in order for the plunger 41 to move the support hole 38 in the axial direction, it is necessary to ensure a minute gap between the outer peripheral surface of the plunger 41 and the inner peripheral surface of the support hole 38. The minute gap is set to have a radial length of, for example, 0.005 mm (5 microns). On the other hand, in the one end portions of the plunger 41 and the support hole 38, a gap is provided between the outer peripheral surface of the one end portion of the plunger 41 and the inner peripheral surface of the one end portion of the support hole 38 by the recess portion 101. The recess portion 101 formed on the one end portion of the plunger 41 has a radial length which is set in a range of 0.05 mm to 0.2 mm. Therefore, the length of the gap formed by the recess portion 101 between the outer peripheral surface of one end portion of the plunger 41 and the inner peripheral surface of the one end portion of the support hole 38 is a total value of the length of the minute gap and the length of the recess portion 101.

In addition, the radial length of the recess portion 101 provided on the outer peripheral surface of the plunger 41 is set to 10 times to 40 times the radial length of the minute gap between the inner peripheral surface of the support hole 38 and the outer peripheral surface of the plunger 41 which are not provided with the recess portion 101.

A volume of the pressurization chamber 56 when the plunger 41 is located at a bottom dead point affects compression efficiency. Thus, it is preferable to design the pressurization chamber 56 while suppressing an increase in volume due to the recess portion 101 as much as possible.

Therefore, even in a case where the plunger barrel 32 is elastically deformed by the fastening force of the bolt 91 and the roundness on the one end portion side of the support hole 38 is reduced, the recess portion 101 is provided on the outer peripheral surface of the one end portion of the plunger 41 in the axial direction. Thereby, a gap larger than the minute gap is ensured between the outer peripheral surface of the one end portion of the plunger 41 and the inner peripheral surface of the support hole 38, and thus the plunger 41 can smoothly move in the support hole 38.

<Modification Example of Plunger and Plunger Barrel>

Figure 5:
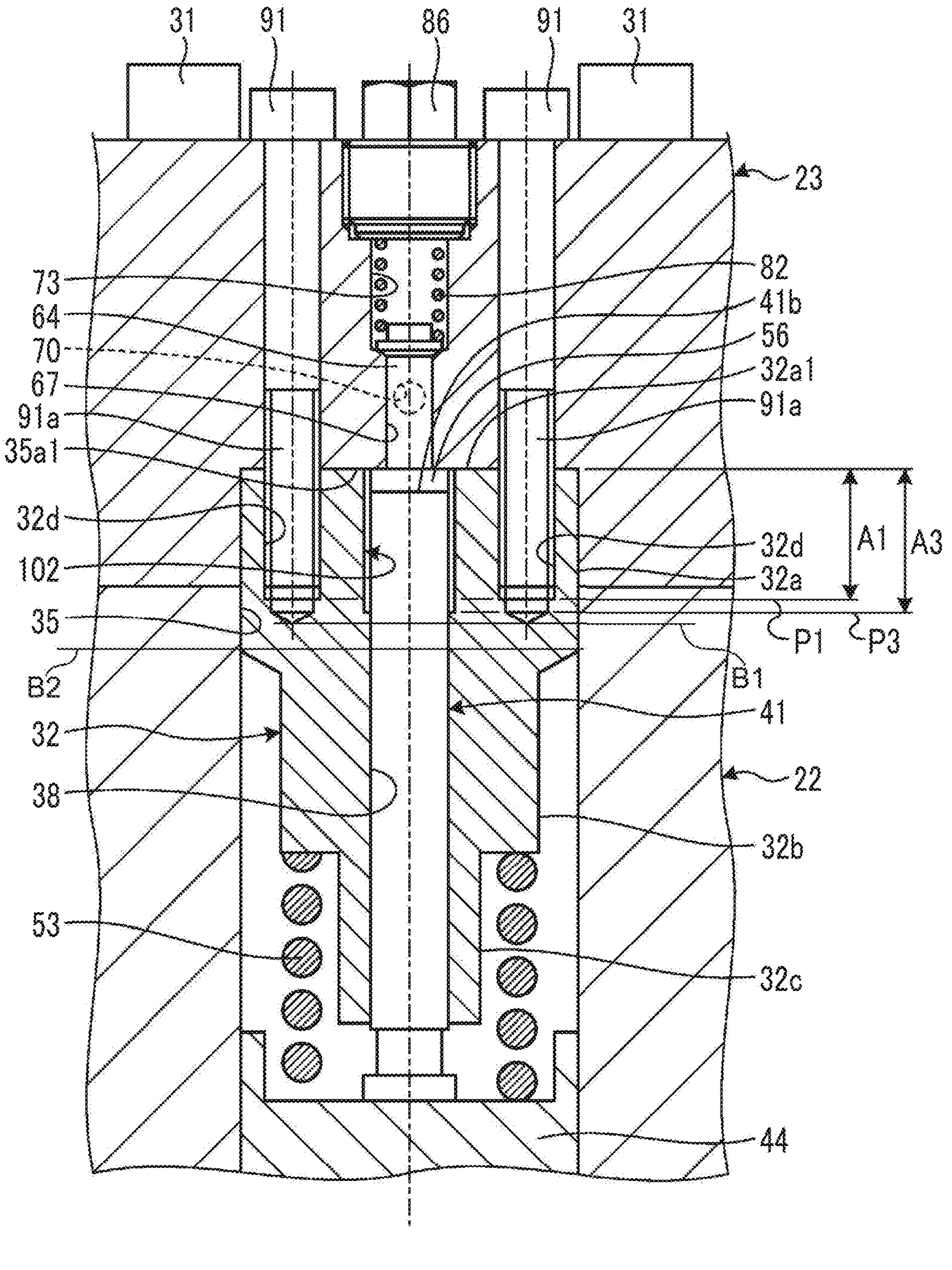
FIG. 5 is an enlarged view illustrating a modification example of the configuration of the plunger and the plunger barrel.

FIG. 5 is an enlarged view illustrating a modification example of the configuration of the plunger and the plunger barrel.

In a modification example of the present embodiment, as illustrated in FIG. 5, a recess portion 102 is provided on the inner peripheral surface of the one end portion of the support hole 38 of the plunger barrel 32 in the axial direction. That is, the support hole 38 has a columnar shape, and the inner peripheral surface of the support hole 38 is concentrically disposed with the outer peripheral surface of the plunger 41. In addition, in the support hole 38, an inner diameter of one end portion on the pressurization chamber 56 side is larger than an outer diameter of the other portion, and thus the recess portion 102 is formed.

The recess portion 102 is provided within a range of a predetermined length A3 from the end surface 32*al* of the first shaft portion 32*a* of the plunger barrel 32 toward the other end portion side. In addition, the recess portion 102 is provided from a screwing position at which the male thread portion 91*a* of the bolt 91 is screwed to the female thread portion 32*d* of the plunger barrel 32 to the other end portion side of the support hole 38 in the axial direction. That is, preferably, a position P3 on the other side (a lower side in FIG. 5) of the support hole 38 in the recess portion 102 is located on the other side (a lower side in FIG. 5) from a position P1 on the other side (a lower side in FIG. 5) of the female thread portion 32*d* of the plunger barrel 32.

Preferably, the radial length of the recess portion 102 of the support hole 38 is the same as the length of the recess portion 101.

In addition, a volume of the pressurization chamber 56 when the plunger 41 is located at a bottom dead point affects compression efficiency. Thus, it is preferable to design the pressurization chamber 56 while suppressing an increase in volume due to the recess portion 102 as much as possible.

Therefore, even in a case where the plunger barrel 32 is elastically deformed by the fastening force of the bolt 91 and the roundness on the one end portion side of the support hole 38 is reduced, the recess portion 102 is provided on the outer peripheral surface of the one end portion of the support hole 38 in the axial direction. Thereby, a gap larger than the minute gap is ensured between the outer peripheral surface of the one end portion of the plunger 41 and the inner peripheral surface of the support hole 38, and thus the plunger 41 can smoothly move in the support hole 38.

[Actions and Effects of Present Embodiment]

According to a first aspect, there is provided a fuel pump including: a pump head 23; plunger barrels 32, 33, and 34 which are provided with support holes 38, 39, and 40 and in which one end portion sides of the support holes 38, 39, and 40 in an axial direction are fastened to the pump head 23; plungers 41, 42, and 43 that are supported by the support holes 38, 39, and 40 so as to be movable along the axial direction; pressurization chambers 56, 57, and 58 partitioned by one end portions of the support holes 38, 39, and 40 and one end portions of the plungers 41, 42, and 43 in the axial direction; fuel channels (fuel discharge channels) 67, 68, and 69 of which the one end portions communicate with the pressurization chambers 56, 57, and 58; suction channels (fuel suction channels) 70, 71, and 72 of which the one end portions communicate with the fuel channels (fuel discharge channels) 67, 68, and 69; and recess portions 101 and 102 provided on at least one of inner surfaces of the one end portions of the support holes 38, 39, and 40 or outer surfaces of the one end portions of the plungers 41, 42, and 43.

With the fuel pump according to the first aspect, the recess portions 101 and 102 are provided on at least one of the inner peripheral surfaces of the support holes 38, 39, and 40 or the outer peripheral surfaces of the plungers 41, 42, and 43. Thereby, a gap is ensured between the outer peripheral surface of the one end portion of the plunger 41 and the inner peripheral surface of the support hole 38. Therefore, even in a case where the plunger barrel 32 is elastically deformed by the fastening force of the bolt 91 and the roundness on the one end portion sides of the support hole 38, 39, and 40 is reduced, the plungers 41, 42, and 43 can smoothly move in the support holes 38, 39, and 40. Thereby, good operability between the plungers 41, 42, and 43 and the plunger barrels 32, 33, and 34 can be ensured. In addition, post-processing of the support holes 38, 39, and 40 is not required, and an increase in processing cost can be suppressed.

In the fuel pump according to a second aspect, the plunger barrels 32, 33, and 34 are fastened to the pump head 23 by allowing bolts 91 to penetrate the pump head 23 and allowing tip portions of the bolts 91 to be screwed around the support holes 38, 39, and 40 in the plunger barrels 32, 33, and 34, and the recess portions 101 and 102 are provided from a screwing position of the bolt 91 in the plunger barrels 32, 33, and 34 to the support holes 38, 39, and 40 or the other end portion sides of the plungers 41, 42, and 43 in the axial direction. Thereby, by ensuring a gap in a region in which the plunger barrel 32 is elastically deformed by the fastening force of the bolt 91 and the roundness of the support holes 38, 39, and 40 is reduced, smooth operation of the plungers 41, 42, and 43 and the support holes 38, 39, and 40 can be ensured.

In the fuel pump according to a third aspect, the plunger barrels 32, 33, and 34 include first shaft portions (large diameter portions) 32*a*, 33*a*, and 34*a* and second shaft portions (small diameter portions) 32*b*, 33*b*, and 34*b* provided on the other end portion side in the axial direction from the first shaft portions 32*a*, 33*a*, 34*a*, and a sealing portion is formed by allowing the bolts 91 to be screwed to end surfaces of the first shaft portions 32*a*, 33*a*, and 34*a* on the one end portion side in the axial direction and allowing end surfaces of the first shaft portions 32*a*, 33*a*, and 34*a* on the one end portion side in the axial direction to come into close contact with the pump head 23. Thereby, high sealing performance of the pressurization chambers 56, 57, and 58 can be ensured.

In the fuel pump according to a fourth aspect, inner peripheral surfaces of the support holes 38, 39, and 40 and outer peripheral surfaces of the plungers 41, 42, and 43 are concentrically disposed, and a radial length of the recess portion 102 provided on the inner peripheral surfaces of the support holes 38, 39, and 40 or a radial length of the recess portion 101 provided on the outer peripheral surfaces of the plungers 41, 42, and 43 is set to 10 times to 40 times a radial length of a gap between the inner peripheral surfaces of the support holes 38, 39, and 40 and the outer peripheral surfaces of the plungers 41, 42, and 43 which are not provided with the recess portions 101 and 102. Thereby, fluctuations in the volumes of the pressurization chambers 56, 57, and 58 can be minimized, and smooth operation between the plungers 41, 42, and 43 and the support holes 38, 39, and 40 can be ensured.

In the fuel pump according to a fifth aspect, the recess portions 101 and 102 have a radial length which is set in a range of 0.05 mm to 0.2 mm. Thereby, the gap between the recess portions 101 and 102 can be set to an appropriate value.

In the above-described embodiment, the support holes 38, 39, and 40 have the same diameter in the axial direction, and one end portions of the support holes 38, 39, and 40 communicate with the fuel channels 67, 68, and 69. On the other hand, the present disclosure is not limited to the configuration. For example, the support hole may be configured with a main body hole having the same diameter as the support holes 38, 39, and 40 and a small diameter portion having a diameter smaller than the diameter of the support holes 38, 39, and 40, and the small diameter portion may communicate with the fuel channels 67, 68, and 69. In this case, the plungers 41, 42, and 43 are movably supported only by the main body holes. In addition, the recess portion 101 is provided at one end portions of the plungers 41, 42, and 43, and the recess portion 102 is provided at one end portion of the main body hole.

Further, in the above-described embodiment, the recess portion 101 is provided at the plungers 41, 42, and 43, and the recess portion 102 is provided at the support holes 38, 39, and 40 of the plunger barrels 32, 33, and 34. On the other hand, the recess portion 101 may be provided at the plungers 41, 42, and 43 and the recess portion 102 may be provided at the support holes 38, 39, and 40 of the plunger barrels 32, 33, and 34.

Further, a form of the fuel injection device 10 and a form of the fuel pump 11 are not limited to the above-described embodiment. For example, the number of the common rails 12 and the fuel injectors 13, the connection position of the fuel pump 11, the number of the plungers 41, 42, and 43, and the plunger barrels 32, 33, and 34 may be appropriately set.

REFERENCE SIGNS LIST

10: fuel injection device
11: fuel pump
12: common rail
13: fuel injector
14: fuel tank
21: retainer
22: pump casing
23: pump head
24: cam shaft
25, 26: bearing
27, 28, 29; cam
30, 31: bolt
32, 33, 34: plunger barrel
35, 36, 37 accommodation hole
38, 39, 40: support hole
41, 42, 43: plunger
44, 45, 46: tappet
47, 48, 49: roller
50, 51, 52: supporting shaft
53, 54, 55: compression coil spring
61, 62, 63: suction valve
64, 65, 66: discharge valve
67, 68, 69: fuel channel
70, 71, 72: suction channel
73, 74, 75: discharge channel
76, 77, 78: compression coil spring
79, 80, 81: actuator
82, 83, 84: compression coil spring
85: communication channel
86, 87: plug
88: connector
89: communication channel
101, 102: recess portion
L11: fuel line
L12: high-pressure fuel line
L13: fuel supply line
B1: a lower end position of pilot hole of the plurality of bolts 91
B2: a lower end position of the large diameter portion of the plunger barrel

The invention claimed is:

1. A fuel pump comprising:

a pump head;

a plunger barrel that is provided with a support hole and in which one end portion side of the support hole in an axial direction is fastened to the pump head;

a plunger that is supported by the support hole so as to be movable along the axial direction;

a pressurization chamber partitioned by one end portion of the support hole and one end portion of the plunger in the axial direction;

a fuel discharge channel of which one end portion communicates with the pressurization chamber;

a fuel suction channel of which one end portion communicates with the fuel discharge channel; and a recess portion that is provided on at least one of an inner surface of the one end portion of the support hole or an outer surface of the one end portion of the plunger, on a lower end surface of the pump head, an accommodation hole is provided that communicates to the fuel discharge channel, the plunger barrel is fastened to the pump head by allowing a plurality of bolts to penetrate the pump head and allowing tip portions of the bolts to be screwed around the support hole in the plunger barrel, the plunger barrel includes a small diameter portion and a large diameter portion on an outer peripheral surface, the large diameter portion provided from the small diameter portion to an one end side in the axial direction in the plunger barrel, has an outer diameter larger than the small diameter portion, the large diameter portion is disposed inside the accommodation hole, and the large diameter portion is supported by the accommodation hole;

taking the one end portion side in the axial direction of the support hole or plunger as the upper side and the other end portion side as the lower side, a lower end position of the recess portion is located, in the lower side with respect to a screwing position of the plurality of bolts in the plunger barrel, in the upper side with respect to a lower end position of a respective pilot hole of each of the plurality of bolts in the axial direction of the plurality of bolts, and in the upper side with respect to a lower end position of the large diameter portion in the axial direction of the plunger barrel.

2. The fuel pump according to claim 1, a sealing portion is formed by allowing the plurality of bolts to be screwed to an end surface of the large diameter portion on the one end portion side in the axial direction and allowing an end surface of the large diameter portion on the one end portion side in the axial direction to come into close contact with the pump head.

3. The fuel pump according to claim 1, wherein an inner peripheral surface of the support hole and an outer peripheral surface of the plunger are concentrically disposed, and a radial length of the recess portion provided on the inner peripheral surface of the support hole or the outer peripheral surface of the plunger is set to 10 times to 40 times a radial length of a gap between the inner peripheral surface of the support hole and the outer peripheral surface of the plunger which are not provided with the recess portion.

4. The fuel pump according to claim 3, wherein the recess portion has a radial length which is set in a range of 0.05 mm to 0.2 mm.

5. The fuel pump according to claim 2, wherein an inner peripheral surface of the support hole and an outer peripheral surface of the plunger are concentrically disposed, and a radial length of the recess portion provided on the inner peripheral surface of the support hole or the outer peripheral surface of the plunger is set to 10 times to 40 times a radial length of a gap between the inner peripheral surface of the support hole and the outer peripheral surface of the plunger which are not provided with the recess portion.

* * * * *